May 11, 1948.   M. A. WEST   2,441,304
CABLE CLAMP
Filed Oct. 13, 1947
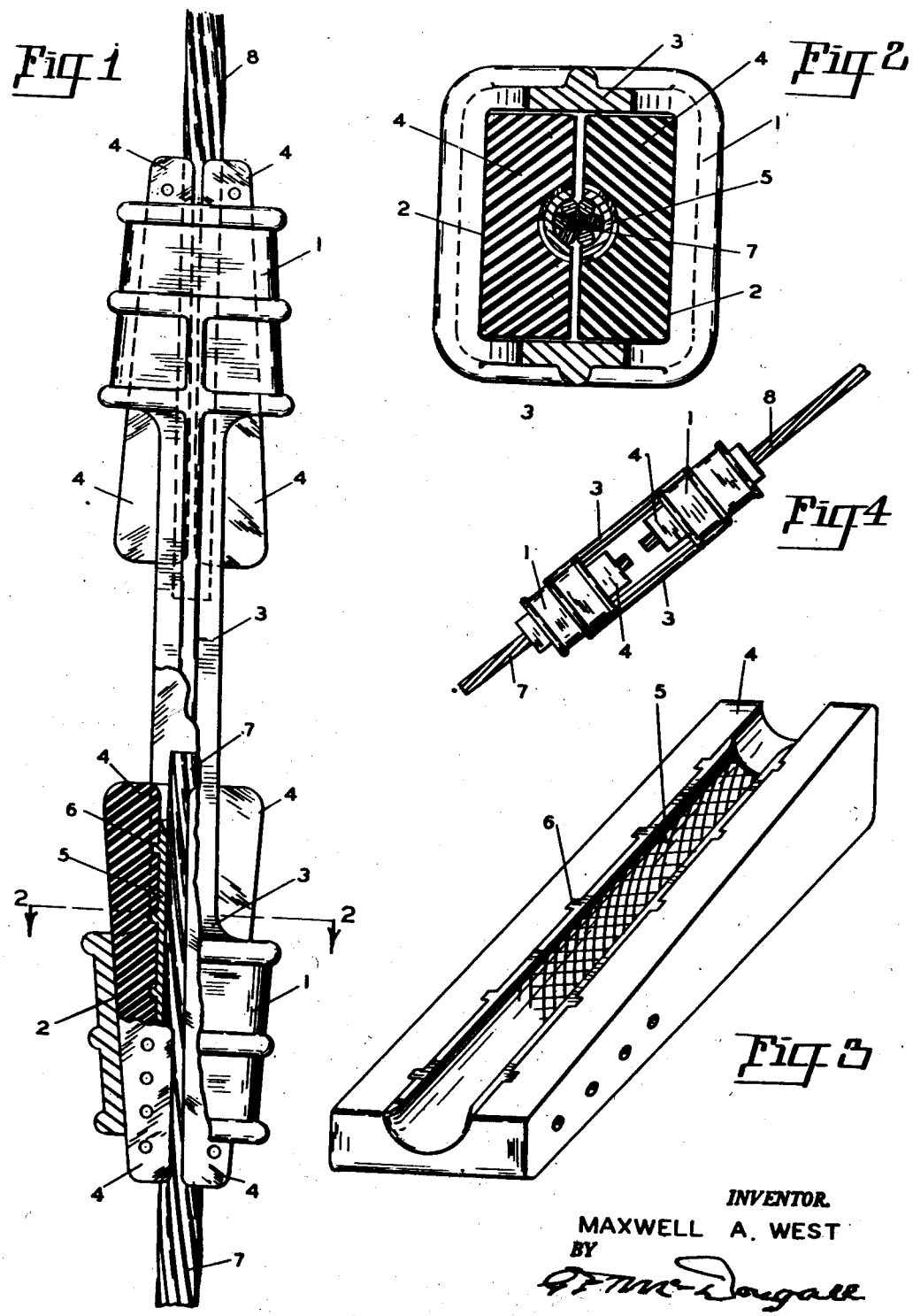
INVENTOR.
MAXWELL A. WEST
BY
*GFMcDougall*
ATTORNEY Patented May 11, 1948

2,441,304

UNITED STATES PATENT OFFICE 2,441,304

CABLE CLAMP

Maxwell A. West, Portland, Oreg.

Application October 13, 1947, Serial No. 779,477

4 Claims. (Cl. 174—178)

This invention is related to cable clamps. It is structurally related to several of my previously filed and copending applications for cable clamps, of which Serial Numbers 598,858, filed June 11, 1945, (now abandoned) and 640,795, filed Jan. 12, 1946, are typical. The foregoing are for wedge type clamps similar except for the wedges, per se of the present application, wherein the wedges are the novel feature when used with the previous clamps.

Since the vast network of power wires overhead is approaching the character of a roof in some localities, and voltages are tending to be stepped up, it becomes increasingly necessary to provide better guy-lines for the carrying poles, that are more strongly coupled together; and to provide these guy-lines with stronger insulators than the rather brittle ceramic strain insulators, that sometimes fail under severe stress and unfortunately also by the impact of the wanton rifleman's bullet. The latter kind of break is especially certain when the load is severe.

It is an object of the present invention to so combine the insulator with the cable clamp that greater stress only increases the holding power, up to the ultimate strength of the guy-line itself; and wherein the insulating material is so disposed that it is wholly proof against rifle fire, even when the high velocity deer charge is used.

It is another object to provide a clamp with a built in insulator that is highly resistant to flashovers that sometimes occur during heavy storms, approaching cloud-burst violence. The foregoing and other objects that will be apparent, such as good security with moderate capital cost, neat appearance, minimum of labor required in the field, and others that will be apparent to those familiar with transmission line design and erection, are the purposes of this invention, the scope of which is to be ascertained hereinafter.

A drawing showing a preferred form of the invention with structures accompanying, for its useful employment in satisfying the objects named shows the invention with accompanying parts, in four figures.

Fig. 1 is a longitudinal view showing a double clamp for coupling two plain ends of cable together, one of the clamps being partly broken away to uncover inner structural relationship of parts;

Fig. 2 is a section of Fig. 1 taken on the plane 2—2 of Fig. 1;

Fig. 3 is a view of the wedge of the invention at enlarged scale; and

Fig. 4 is a perspective view of the structure shown in Fig. 1 at reduced scale, the purpose of which is to illustrate the other view, normal to the showing in Fig. 1.

Describing the drawing in more complete detail. A wedge socket, for which steel is recommended, is indicated by numeral 1. It will be provided with an inner tapered wedge and cableway 2, preferably of rectangular section as shown in Fig. 2. Two wedge sockets 1, are shown in Figs. 1 and 4 to form a double insulating coupling for the cables 7 and 8, the said wedge sockets being oppositely coaxially separated by the distance pieces 3, preferably made integral with the wedge sockets 1 of each clamp.

A pair of wedges 4, of which one is shown in Fig. 3 and two of which form a cable gripping and holding means when a cable is wedged between them, is shown in Figs. 1 and 4. The bodies of these wedges will be moulded plastic of high compressive strength and the relative bulk or proportional part of the whole wedge can be well approximated from the proportion shown in Fig. 2, for pole lines carrying normal high voltages, while for those carrying the higher voltages the plastic may be larger. Also the total dielectric strength may be made as high as needed by increasing the sets of insulating wedges in the system after the manner suggested in Fig. 1. While the dielectric strength is somewhat less than that of one multiplied by the total number, it increases nearly that much. A plastic of phenol-formaldehyde with fabric laminations, now carrying a trade name of "Panelyte" and possessing the necessary dielectric strength, has a compressive strength of forty thousand pounds per square inch or better, the ease of moulding in low cost moulds and other economic qualities necessary to make it available as an example of a substance that meets the objects stated. Since the plastics art is advancing rapidly, even better compositions may be expected.

The wedges 4, will be made integral by moulding, with a steel cable grip sleeve 5, roughened, and of sufficiently accurate configuration to grip a cable of the size contemplated for use. The cable grip sleeve 5, may be made with ribs such as the ribs 6 shown in Figs. 2 and 3, or any suitable type of deformation of the external surface, so that it will be firmly locked to the plastic portion of the wedge. The cable grip may be case-hardened for better cable gripping qualities. The spiral surface so often seen in proposed patented structures, is a fallacy, because when a cable is stressed the pitch changes, while the spiral of the wedges does not. Also, the wedges would have to be made right and left, otherwise they would never fit.

The steel cable grip sleeves 4, are relatively narrow and embedded in the plastic so that a space is left between the metal of the sleeve 5, and the metal of the socket 1, so that the tendency to arc over is reduced to a minimum.

In the drawings, 6 and 7 represent two parts of cable, coupled together by the double clamp structure of Figures 1 and 4. The first, 6, will be assumed to be suitably attached to the top of a pole or other object that needs a guy-line and the bottom or 7 to be attached to a ground anchor.

Having fully described my invention so that those familiar with transmission line design and the conditions to be met, can usefully employ the disclosure herein, what I claim as new and desire to secure by Letters Patent, is:

1. In a combination cable clamp and insulating device for guy-lines and the like, a wedge type socket, a pair of wedges that hold a cable wedgingly between them, characterized by two duplicate wedges, the greater bulk of each wedge being of a hard high dielectric plastic material, having moulded into its cable gripping face a roughened steel sleeve that is narrower than the body of the wedge to maintain a spacing between the edges of the sleeve and the metal of the socket within which they are contained.

2. A wedge for cable clamps or the like that embodies wedging with insulating properties comprising a wedge shaped plastic body, a steel sleeve with a semi-circular face anchored in one tapered face of the wedge, the said sleeve forming a groove in the face of the wedge when anchored therein, the wedge being roughened in its grooved face and having deformations on its opposite face to anchor it into the plastic body.

3. A wedge type cable grip comprising a tapered body, provided with an axial through wedgeway of generally rectangular section, a pair of moulded tapered wedges of plastic dielectric material that occupy the said tapered body, being grooved to wedgingly hold a cable between them, each of said wedges having a steel lining for its groove anchored within its structure and held spaced from the body to utilize the dielectric ability of the plastic material of the wedges.

4. Wedges for employment in opposed pairs to grip a wire cable between them when the wedges are driven into a metal socket and at the same time to electrically insulate the cable from the socket, comprising wedges made chiefly of a plastic material having high dielectric strength and high structural strength, said wedges having two tapered opposite sides, and a steel sleeve inlaid in one side of each wedge, said sleeve generally semi-circular in section to grip a wire cable, in cooperation with a mating wedge.

MAXWELL A. WEST.

REFERENCES CITED

The following references are of record in the file of this patent:

UNITED STATES PATENTS

| Number | Name | Date |
|---|---|---|
| 1,011,652 | Steinberger | Dec. 12, 1911 |
| 1,793,140 | Steinmayer | Feb. 17, 1931 |
| 1,832,138 | Pounder | Nov. 17, 1931 |
| 1,862,886 | Dublin | June 14, 1932 |
| 2,055,650 | Burleson | Sept. 29, 1936 |

FOREIGN PATENTS

| Number | Country | Date |
|---|---|---|
| 790,402 | France | Sept. 9, 1935 |